United States Patent Office 3,357,960
Patented Dec. 12, 1967

3,357,960
BUTADIENE-ISOBUTYLENE COPOLYMERS PREPARED BY USING CATALYST COMPOSED OF A GRIGNARD REAGENT AND TITANIUM TETRAHALIDE
Bernard Charles Barton, Butler, Walter Nudenberg, West Caldwell, and Edward Axel Delaney, Morris Plains, N.J., assignors to Texas-U.S. Chemical Company, Parsippany, N.J., a corporation of Delaware
No Drawing. Filed July 20, 1965, Ser. No. 473,497
8 Claims. (Cl. 260—85.3)

This application is a continuation-in-part application of application Ser. No. 163,855, filed Jan. 2, 1962.

This invention relates to novel elastomeric copolymers of butadiene and isobutylene. More specifically, it relates to butadiene-isobutylene elastomeric copolymers comprised of 2–40 weight percent of isobutylene and 60 to 98 weight percent of butadiene. This invention is also directed to a process for preparing novel butadiene-isobutylene copolymers, among which are copolymers containing a major part of the butadiene in the cis configuration.

High molecular weight polyisobutylene and the polybutadiene are produced under essentially different reaction conditions. Unlike other known polyolefins, polyisobutylene is thermodynamically unstable at room temperature. Consequently isobutylene cannot be homopolymerized to the high molecular weight necessary for elastic properties at room temperature and above. It is general practice to produce polyisobutylene at very low temperatures of the order of about −50° C. to −90° C. On the other hand, it is customary to produce polybutadiene at temperatures of about −10° C. and higher. Prior to this invention this essential difference in reaction conditions appeared to be an insurmountable obstacle to the formation of high molecular weight butadiene-isobutylene copolymers with a major portion of butadiene. The present invention provides a process whereby elastomeric butadiene-isobutylene copolymers are made available for the first time.

The new butadiene-isobutylene copolymers are prepared by contacting a mixture of isobutylene and butadiene with a catalyst comprising a Grignard reagent and titanium tetrahalide and maintaining the unreacted butadiene content of the reaction mixture below 20 weight percent.

The butadiene-isobutylene copolymers possess better processing characteristics than cis-polybutadiene. For example, a cis polybutadiene having a Mooney viscosity of 50 adds carbon black with difficulty whereas a butadiene-isobutylene copolymer of the same Mooney readily adds carbon black and is simply processed. The physical properties of vulcanizates prepared from butadiene-isobutylene copolymers are similar to those found for polybutadienes prepared in hydrocarbon solutions. The butadiene-isobutylene copolymers are particularly useful in tire tread manufacture.

The isobutylene content of the butadiene-isobutylene copolymers of this invention is between 2 and 40 weight percent and usually between 5 and 30 weight percent. Conversely, the butadiene content is between 60 and 98 weight percent and usually between 70 and 95 weight percent.

Butadiene-isobutylene copolymers of this invention have Mooney viscosities (ML-4 at 212° F.) of between 5 and 200. Those copolymers having the minimum Mooney viscosity, i.e., 5, have Staudinger molecular weights of about 180,000. The copolymers having higher Mooney values have correspondingly higher molecular weight. These copolymers are essentially linear, as indicated by an absence of cross-linking (also referred to as gelling). These copolymers have iodine numbers of 290 (for 60% butadiene copolymer) or higher, as calculated using the Hanus procedure described in "Organic Analysis," I. Mitchell et al., vol. 3, Interscience Publishers, Inc. (1956), at pp. 224–227. The iodine numbers increase as the butadiene proportion of the copolymer increases.

A preferred method of preparing butadiene-isobutylene copolymers is with Grignard-titanium tetrahalide catalysts whose use in the formation of cis-polybutadiene forms the subject matter of the commonly-assigned, application Ser. No. 38,417, filed June 24, 1960, now abandoned in favor of application Ser. No. 288,877, filed June 19, 1963, now abandoned in favor of copending application Ser. No. 599,671, filed Dec. 5, 1966.

The Grignard component of the catalyst used in this invention has the general formula RMgX and/or RMgR+MgX$_2$ wherein X is chlorine, iodine, bromine or fluorine and R is a hydrocarbyl radical containing 1–30 carbon atoms. The titanium tetrahalide component is represented by the general formula TiX$_4$ wherein X is defined as in the Grignard reagent but may represent the same or different halogen atoms.

Grignard reagents usable in the Grignard-titanium tetrahalide catalyst system are exemplified by the following: dodecyl magnesium iodide, dodecyl magnesium bromide, decyl magnesium iodide, stearyl magnesium iodide, ethyl magnesium iodide, methyl magnesium iodide, methyl magnesium chloride, myristyl magnesium bromide, nonyl magnesium iodide, nonyl magnesium fluoride, naphthyl magnesium bromide, phenyl magnesium bromide, phenyl magnesium chloride, ethyl magnesium chloride, hexyl magnesium iodide, 2-ethylhexyl magnesium bromide, methylcyclohexyl magnesium iodide, p-tertiary butyl benzyl magnesium iodide, propargyl magnesium bromide, hexadecyl magnesium chloride and cetyl magnesium fluoride. The bromo, chloro and iodo Grignard reagents are preferred because of their greater simplicity of preparation and their greater reactivity in catalyzing the production of butadiene-isobutylene copolymers.

The titanium tetrahalide of the catalyst system employed in this invention is exemplified by the following: titanium tetraiodide, titanium tetrabromide, titanium tetrachloride, titanium tetrafluoride and mixed titanium tetrahalides such as titanium dichloride diiodide, titanium dibromide diiodide and titanium monobromide triiodide.

The Grignard-titanium tetrahalide catalyst comprises 1 to 10 mols of Grignard per mol of titanium tetrahalide. In order to obtain a high cis content butadiene-isobutylene copolymer, that is, one in which butadiene is 90 percent and more in the cis configuration, the mol ratio of Grignard to titanium tetrahalide is at least 2:1 and preferably between 2.5 and 5 to 1.

An additional requirement of the Grignard-titanium tetrahalide catalyst system in order to obtain a copolymer having a butadiene component with a minimum 90% cis configuration is that iodine be present in the catalyst system either as elemental iodine or as a substituent of the Grignard reagent or of the titanium tetrahalide. The presence of iodine in the catalyst system exerts a directing influence on the polymerization reaction with the result that the butadiene component of the butadiene-isobutylene copolymer generally has a high cis content, e.g. as high as 98%.

Concentrations of catalyst employed in the production of the butadiene-isobutylene copolymers are best expressed in mols of catalyst, that is, mols of Grignard reagent plus mols of titanium tetrahalide, per mol of butadiene reactant. The broad catalyst concentration range is between 0.000001 and 0.01 mol of catalyst per mol of butadiene in the butadiene-isobutylene reaction mixture. The preferred catalyst concentration is between 0.00001 and 0.005 mol of catalyst per mol of butadiene reactant.

As disclosed in the afore-identified application Ser. No. 38,417, the Grignard-titanium tetrahalide catalyst should either be prepared and maintained at a temperature below 0° C. prior to its use or prepared and maintained in a concentrated slurry in an inert hydrocarbon solvent wherein the catalyst concentration is at least 10 and preferably more than 15 weight percent. The use of sub-zero temperatures for preparation and maintenance or the use of a concentrated slurry for preparation and maintenance of the Grignard-titanium tetrahalide catalyst assures that the Grignard and titanium tetrahalide react to form the active catalyst $R.TiX_3$ wherein R is the hydrocarbyl radical from the Grignard and substantially prevents further reaction to form polymeric and trivalent titanium halide compounds. The active catalyst is prepared by the following equation:

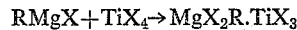

$$RMgX + TiX_4 \rightarrow MgX_2 \cdot R.TiX_3$$

When the catalyst mixture is maintained at temperatures below 0° C. or in the form of a slurry wherein the catalyst concentration is above 10 weight percent, further reaction of the highly active catalyst, $R.TiX_3$, is substantially eliminated.

Another procedure for preparing an active Grignard titanium tetrahalide catalyst system involves separate addition of the individual catalyst components, that is, Grignard reagent and titanium tetrahalide, to a reaction mixture containing isobutylene and butadiene. On reaction of Grignard reagent and the titanium tetrahalide to form the active catalyst $R.TiX_3$ in the presence of isobutylene and butadiene reactants, conversion of the active catalyst to inactive polymeric and trivalent products is also substantially eliminated.

The production of the butadiene-isobutylene copolymer also requires that the concentration of unreacted butadiene in the reaction mixture does not exceed approximately 20 weight percent of the total butadiene-isobutylene reaction mixture. If the reaction mixture contains more than 20 weight percent unreacted butadiene, a homopolymerization reaction rather than a copolymerization reaction takes place because the isobutylene does not enter into the polymerization reaction under such reaction conditions.

In view of the requirement that the reaction mixture must contain less than about 20 weight percent unreacted butadiene in order to obtain butadiene-isobutylene copolymer, the butadiene reactant is preferably added incrementally.

Both the isobutylene and butadiene reactants should be relatively free from moisture, preferably below 10 p.p.m. The reactants should also be essentially free from sulfur, carbonyl groups and peroxides.

The copolymerization process of the invention is effected at temperatures of −10° C. to about 90° C. with temperatures between +10 and 50° C. being preferred.

The copolymerization process is usually effected at sufficient pressure to maintain liquid phase operation. Broadly speaking, pressures between atmospheric and 500 p.s.i.g. may be employed but pressures between 30 and 100 p.s.i.g. are usually adequate to ensure the maintenance of a liquid phase operation.

The copolymerization reaction is usually effected in the presence of an inert hydrocarbon solvent. The large excess of isobutylene required for the production of the butadiene-isobutylene copolymer also acts as a part of the solvent medium. Aromatic hydrocarbons such as benzene, toluene and xylene are preferred. The solvents must be dry, free from any significant sulfur content and peroxide-free.

The copolymerization reaction can be effected batchwise or in a continuous manner. In either case, the reaction is normally continued until more than 80 percent of the butadiene added to the reaction mixture has been converted to copolymer. The usual reaction times vary from ¼ hour to 10 or more hours with the reaction temperature, the catalyst activity and the size of the polymerization reaction mixture all affecting the duration of the reaction.

Various procedures may be employed for isolation of the copolymer. For example, the copolymer can be precipitated from the hydrocarbon solution by addition of a low molecular weight alcohol. Another procedure involves precipitating the copolymer in the from of a crumb by steam floccing. A third alternative involves conversion of the copolymer to a latex by addition of water and emulsifying agents and precipitation of the latex by well-known salt acid precipitation technique.

The production of butadiene-isobutylene copolymers is illustrated in the following examples. Example 1 shows the ineffectiveness of a Grignard-titanium tetrahalide catalyst in polymerizing isobutylene alone. Examples 2-4 show the formation of butadiene-isobutylene copolymers. Example 5 shows the necessity of maintaining the butadiene content of the reaction mixture below the prescribed maximum in order to obtain a butadiene-isobutylene copolymer.

*Example 1*

A solution comprising 430 grams of benzene dried by contact with a 4A molecular sieve and 90 grams of isobutylene (C.P. grade) dried by passage through Drierite was charged to a 1 liter, 3-necked flask provided with a stirrer and an argon flush tube. To the benzene-isobutylene solution which was maintained under an argon atmosphere there was added 100 ml. of a benzene slurry of the catalyst comprising 0.32 millimol of dodecyl magnesium bromide and 0.16 millimol of titanium tetraiodide per ml. of benzene slurry. The temperature was allowed to rise to 25° C. Despite the high level of catalyst concentration and relatively high temperature level there was no evidence of isobutylene polymerization to polymer even after 60 minutes and no polymeric material was isolated from the reaction mixture.

*Example 2*

To a mixture comprising 430 grams of benzene and 90 grams of isobutylene and 25 ml. of the benzene catalyst slurry employed in Example 1, butadiene was introduced as a gas below the surface thereof at a temperature of 25° C. An immediate viscosity increase was observed upon the introduction of the butadiene. While the reaction mixture was cooled by immersion of the 3-necked flask in an ice bath, the introduction of butadiene was continued for 20 minutes until a total of 60 grams of the butadiene had been added to the reaction mixture. After the butadiene introduction was complete there was noted an increase in viscosity of the reaction solution for another 2½ hours. The reaction mixture was then poured into ethanol containing dimethylamine and N-phenyl-N'-cyclohexyl-p-phenylene diamine, Flexone 6H, in amounts equivalent to 3% and 2%, respectively, of the butadiene monomer added to reaction mixture. The separated copolymer was dried in a vacuum oven at about 70° C. Infrared analysis of the dried polymer showed that it contained 20% isobutylene, 77% butadiene, in the cis-1,4 configuration and approximately 3 weight percent butadiene approximately equally divided between the trans and vinyl structure. The butadiene component of the copolymer was approximately 90% in the cis configuration. The copolymer which was gel free, had a Mooney viscosity (ML–4) of 15.

Example 3

To a solution of 120 grams of isobutylene in 430 grams of benzene there was added 50 ml. of a benzene slurry of a catalyst containing titanium tetraiodide and dodecyl magnesium bromide in the same mol quantities as in Example 1. While the reaction vessel was held at 10° C., butadiene was introduced as a gas beneath the surface of the liquid at a rate of about 4 g./min. until the viscosity of the solution increased which required about 10 minutes. The butadiene flow was then discontinued and the reaction mixture stirred for approximately one hour after which time no further change in viscosity was noted. Additional butadiene was then charged at a rate of approximately 6 g./min. for 5 minutes and then discontinued. Further viscosity increase was noted for an additional hour after which butadiene addition was repeated for another 5 minutes (6 g./min.). In all, 100 grams of the butadiene was added. Approximately 130 grams of polymer were isolated from the reaction mixture by the procedure outlined in Example 2. Infrared analysis of the polymer shows it contained 34% isobutylene and 66% butadiene; the butadiene component comprised 63 parts cis-1,4 structure, 1.6 part vinyl structure and 1.4 part trans-1,4 structure. The copolymer had a dilute solution viscosity (DSV) of 1.5. Partial fractionation of the copolymer by precipitation from benzene and examination of the fractions by infrared analysis indicated that all fractions contained the same isobutylene content.

Example 4

To a stainless steel 5 gallon reactor provided with a cooling jacket and condenser, 18.5 pounds of benzene and 16.75 pounds of isobutylene were charged at 10° C. and 1000 cc. of benzene slurry of the catalyst prepared from 39.2 grams of naphthyl magnesium bromide and 37.4 grams of titanium tetraiodide was added thereto. 1 pound of butadiene was introduced as a gas to the reaction mixture over a period of 25 minutes after which butadiene flow was discontinued and the reactor stirred for 80 minutes at which point it contained 3.8% solids (complete polymerization of 1 pound of butadiene alone would have resulted in a solid content of 2.8%). Additional butadiene (6.5 pounds) was introduced to the reactor intermittently over a period of 5 hours. The reaction was terminated as in Example 2 at 440 minutes and 2.2 pounds of copolymer was isolated from the reaction mixture. The infrared analysis of the copolymer indicated that it comprised approximately 96% butadiene and 4% isobutylene. The copolymer had a Mooney viscosity (ML–4) of 89.

Example 5

This example illustrates the necessity of maintaining the unreacted butadiene content of the butadiene-isobutylene reactant mixture below 20% in order to obtain a butadiene-isobutylene copolymer. To a 5 gallon stainless steel reactor of the type employed in Example 4, 28.5 pounds of benzene, 5.5 pounds of isobutylene and 5.5 pounds of butadiene were charged. A benzene slurry of a catalyst prepared from alpha-naphthyl magnesium bromide and titanium tetraiodide in a mol ratio of 2:1 was also added to the reaction mixture. The catalyst was prepared by adding 116.6 millimols of $TiI_4$ to a slurry of 259 millimols of naphthyl magnesium bromide in 800 ml. of benzene. An extremely rapid exothermic polymerization occurred on addition of the catalyst. The solids content was approximately 14.2% indicating 100% conversion in 10 minutes during which time the temperature rose from 5 to 65° C. The isolated polymer was shown by infrared analysis to be polybutadiene free of isobutylene units.

Examples 1 to 4 illustrate the preparation of the novel butadiene-isobutylene copolymers of this invention using the Grignard-titanium tetrahalide catalyst system. This catalyst system is different from the aluminum alkyl/titanium tetrahalide system since the latter does not give butadiene-isobutylene copolymers.

Example 6

Three copolymers of butadiene-isobutylene were prepared in accordance with the procedure of Example 2. The iodine number of each was calculated using the Hanus procedure described in "Organic Analysis," J. Mitchell et al., vol. 3, 1956, Interscience Publishers, as follows:

| Percent Butadiene | Percent Isobutylene | Iodine Number |
| --- | --- | --- |
| 63 | 37 | 307 |
| 80 | 20 | 384 |
| 94 | 6 | 439 |

As many embodiments of this invention may be made without departing from the spirit and scope thereof, it is to be understood that the invention includes all such modifications and variations as come within the scope of the appended claims.

We claim:
1. A process for preparing linear elastomeric copolymers of butadiene and isobutylene, said polymers consisting essentially of about 2 to 40 weight percent of isobutylene and about 60 to 98 weight percent butadiene which comprises (a) contacting a reaction mixture of isobutylene and butadiene with a catalyst comprising a Grignard reagent and titanium tetrahalide in ratio of 1–10 moles Grignard per mole of titanium tetrahalide and (b) maintaining the unreacted butadiene monomer content of said reaction mixture below 20 weight percent of total unreacted monomer in the system, adding butadiene thereto as necessary to form the ultimate butadiene-isobutylene copolymer, and after reaction is completed, recovering the polymer.

2. A process according to claim 1 in which said polymerization is effected at a temperature between −10° C. and 90° C. and at a pressure between atmospheric and 500 pounds per square inch gage.

3. A process according to claim 1 in which said catalyst concentration is between 0.000001 and 0.01 mol of catalyst per mol of monomeric butadiene reactant in the system during the reaction.

4. A process for preparing linear elastomeric copolymers of butadiene and isobutylene consisting essentially of about 2 to 40 weight percent of isobutylene and about 60 to 98 weight percent butadiene in the copolymer, said butadiene component of the copolymer having at least 90 weight percent cis configuration which comprises (a) contacting a reaction mixture of isobutylene and butadiene with an iodine-containing catalyst system comprising a Grignard reagent and titanium tetrahalide in ratio of 1–10 moles Grignard per mole of titanium tetrahalide, (b) said catalyst system containing said Grignard reagent and titanium tetrahalide in a mol ratio of at least 2:1, (c) and maintaining the unreacted butadiene content of said reaction mixture below 20 weight percent of total unreacted monomer present, adding butadiene thereto as it is copolymerized, and recovering copolymer upon completion of the reaction.

5. A process according to claim 4 in which said polymerization is effected at a temperature between −10° C. and 90° C. and at a pressure between atmospheric and 500 pounds per square inch gage.

6. A process according to claim 4 in which said catalyst concentration is between 0.000001 and 0.01 mol of catalyst per mol of butadiene reactant.

7. A process according to claim 4 in which polymerization is effected at a temperature between 10° and 50° C.

and in the presence of a catalyst containing dodecyl magnesium bromide and titanium tetraiodide.

8. A process according to claim 4 in which the catalyst contains naphthyl magnesium bromide and titanium tetraiodide.

References Cited

UNITED STATES PATENTS

| | | | |
|---|---|---|---|
| 2,607,764 | 8/1952 | Nelson et al. | 260—85.3 |
| 2,977,349 | 3/1961 | Brockway et al. | 260—94.3 |
| 3,135,725 | 6/1964 | Carlson et al. | 260—94.3 |
| 3,165,503 | 1/1965 | Kahn et al. | 260—94.3 |
| 3,230,209 | 1/1966 | Cesare | 260—94.3 |

FOREIGN PATENTS 625,158   3/1963   Belgium.

JOSEPH L. SCHOFER, *Primary Examiner.*

E. J. SMITH, *Assistant Examiner.*